UNITED STATES PATENT OFFICE.

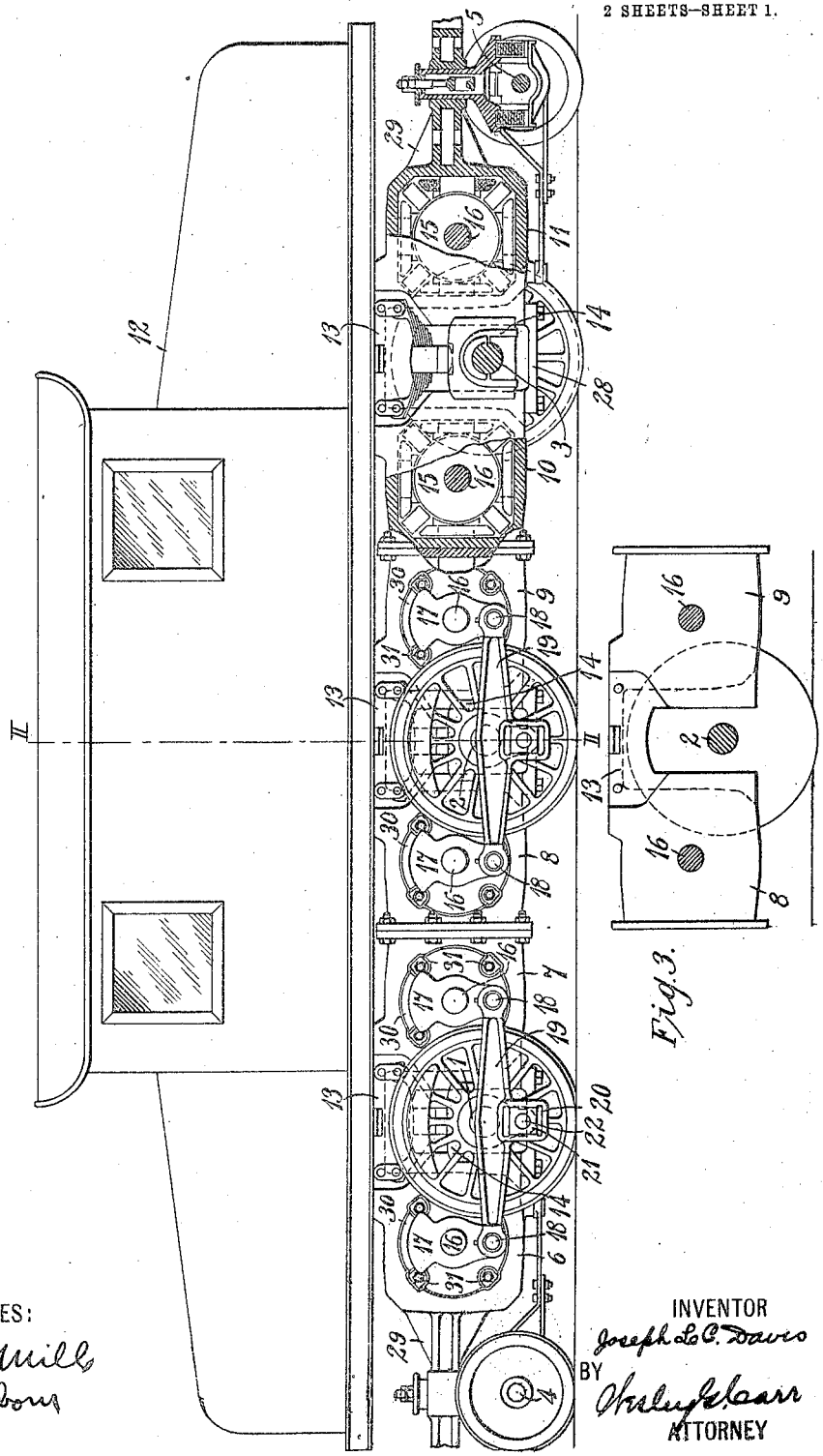

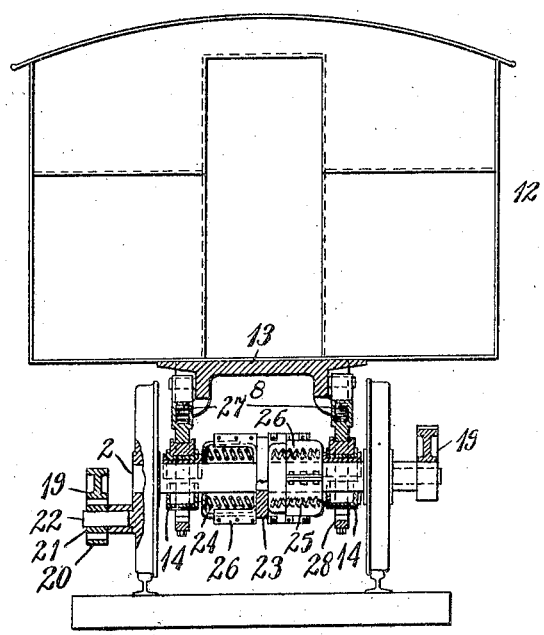

JOSEPH LE CONTE DAVIS, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRIC LOCOMOTIVE.

1,074,841.

Specification of Letters Patent.

Patented Oct. 7, 1913.

Application filed February 21, 1911. Serial No. 609,945.

*To all whom it may concern:*

Be it known that I, JOSEPH LE CONTE DAVIS, a citizen of the United States, and a resident of Pittsburgh, in the county of Allegheny and State of Pennsylvania, have invented a new and useful Improvement in Electric Locomotives, of which the following is a specification.

My invention relates to electric locomotives and other railway vehicles and particularly to such locomotives as are adapted for hauling very heavy trains at relatively high speeds.

One object of my invention is to provide a railway vehicle of the class above indicated, that shall be simple in construction and involve the use of a minimum number of parts on the running gear.

A second object of my invention is to permit the use of driving motors of relatively large size and making, at the same time, a particularly simple and direct operative connection between the motors and the driving axles.

A further object is to uniformly distribute the weight of the motors on the axles and maintain a symmetrical arrangement between each axle and the motors associated therewith.

Electric locomotives have heretofore been constructed in which the motor armatures were mounted directly upon the axles of the vehicle, but, with this arrangement, the size and capacity of the motors are necessarily limited by the size of the driving wheels and, in order to avoid objectionable wear on the track and roadbed, some relatively expensive yielding connection is provided between the motor armature and the driving wheels.

According to my present invention, the motor frames are either cast integral or are bolted or otherwise secured together to constitute a single combined locomotive frame structure and motor field frame structure. The motors are arranged in pairs, the upper halves of the motor frames being joined together in the form of a yoke, and the two motors of each pair being symmetrically disposed relative to one of the vehicles axles which is free to adjust itself vertically in the space between the motors. Adjacent groups of motors are either bolted together, as above indicated, or may be integral. The locomotive frame, consisting of the group of motors, is yieldingly supported by means of springs which rest on the journal boxes of the driving axles, in the usual manner. The cab of the locomotive is mounted directly on the group of motor frames which constitute the frame of the locomotive.

Figure 1, of the accompanying drawings, is a side elevation, with one driving wheel removed, and one pair of motors shown in cross section, of a locomotive constructed in accordance with my invention. Fig. 2 is a transverse sectional elevation on the line II—II of Fig. 1. Fig. 3 is a side elevation of one pair of the motors embodied in the locomotive shown in Fig. 1, the motor shafts and the corresponding axle being shown in section.

Referring to the drawings, the locomotive here shown comprises a plurality of driving wheel axles 1, 2 and 3, guide wheel axles 4 and 5, a plurality of driving motors 6, 7, 8, 9, 10 and 11, the frames of which constitute the locomotive frame, and a cab or body 12.

The driving motors may be divided into three groups of two each, the motors 6 and 7 being associated with, and operatively connected to, the axle 1, and the motors 8 and 9 and 10 and 11 bearing the same relations, respectively, to the axles 2 and 3. The two motors which constitute one group are symmetrical relative to the axle with which they are associated and are joined by means of a yoke 13 which is integral with the motor frames and constitute pedestals to receive the journal boxes 14 with which each axle is provided.

The motor armatures 15 are provided with shafts 16, in the usual manner, to the ends of which crank heads 17 are secured. The crank heads are each provided with crank pins 18 which are connected to the respective ends of Scotch yokes 19, having the usual offset projections 20, in which the bearing blocks 21 for wheel center pins 22 are adjustably supported. By this arrangement, the two motors are directly connected to the axle between them by means of a very simple connection while the motors form a part of the body of the locomotive (their frames, in fact, constituting a part of the locomotive frame) and are spring-borne parts of the locomotive. It is therefore evident that the inertia of the wheel axles is relatively small, so that they readily follow the irregularities and curves of the track.

The structure lends itself readily to railway service since it is easy to disconnect one pair of side rods or yokes and to then drop out one of the wheel axles. The motor armatures may then be removed and repaired or replaced by removing the usual end brackets 30 which are held in position by bolts 31.

The axles may be centered by any suitable yielding means, such as that shown in Fig. 2 of the drawings, to which special reference may now be had.

As here shown, the wheel axle is provided with a central collar 23 and two sets of helical springs 24 and 25 which are disposed about the axle, one set on each side of the center between the collar and one of the journal boxes 14. The springs are preferably inclosed in telescoping casings 26, or are covered by some other suitable means in order to exclude the dirt.

Any suitable springs, or combination of springs, and links and levers may be employed for supporting the locomotive frame on the journal boxes.

For convenience of illustration, I have shown semi-elliptic springs 27, the ends of which are secured to the yoke 13, and the middle portions of which are mounted directly on the journal boxes.

Pedestal binders 28 are preferably provided in the usual manner, although the frame structure is sufficiently rigid to permit the entire locomotive to be lifted from the axles by the ends of the frame.

The guide wheel axles 4 and 5 are preferably employed when the driving wheels are relatively large, but they may, otherwise, be omitted. When they are employed, they may be pivotally secured to projections 29 on the locomotive frame, as shown in Fig. 1 of the drawings, so that they constitute swiveling pony trucks.

My invention is not restricted to the arrangement illustrated in the drawings, and I desire that only such limitations shall be imposed as are indicated in the appended claims.

I claim as my invention:

1. A railway vehicle comprising wheel axles, and a plurality of driving motors having frames which together constitute the entire frame of the locomotive.

2. A railway vehicle comprising wheel axles, and a plurality of driving motors arranged in pairs having their armatures operatively connected to the axles and having their field magnet frames joined together to constitute the vehicle frame.

3. A railway vehicle comprising wheel axles, a pair of driving motors for each axle, Scotch yoke connections between the armatures of each pair of motors and the corresponding axle, and yokes joining the motor frames together over the axle.

4. A railway vehicle comprising a plurality of wheel axles, and electric driving motors having armatures connected to the wheel axles in pairs and having field magnet frames which together constitute a yieldingly supported locomotive frame.

5. A railway vehicle comprising a plurality of wheel axles, a frame yieldingly supported thereon, a body mounted on the frame and a plurality of driving motors arranged in pairs and respectively associated with, and operatively connected to, the wheel axles, the locomotive frame being composed of the joined frames of the driving motors.

In testimony whereof, I have hereunto subscribed my name this 10th day of Feb., 1911.

JOSEPH LE CONTE DAVIS.

Witnesses:
  WM. HOLDEN,
  B. B. HINES.